US010477285B2

(12) United States Patent
Winograd

(10) Patent No.: US 10,477,285 B2
(45) Date of Patent: Nov. 12, 2019

(54) WATERMARK-BASED DATA RECOVERY FOR CONTENT WITH MULTIPLE ALTERNATIVE COMPONENTS

(71) Applicant: Verance Corporation, San Diego, CA (US)

(72) Inventor: Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 101 days.

(21) Appl. No.: 15/746,326

(22) PCT Filed: Jul. 20, 2016

(86) PCT No.: PCT/US2016/043199
§ 371 (c)(1),
(2) Date: Jan. 19, 2018

(87) PCT Pub. No.: WO2017/015399
PCT Pub. Date: Jan. 26, 2017

(65) Prior Publication Data
US 2018/0220200 A1    Aug. 2, 2018

Related U.S. Application Data

(60) Provisional application No. 62/194,756, filed on Jul. 20, 2015.

(51) Int. Cl.
*H04N 21/8358* (2011.01)
*H04N 21/218* (2011.01)
(Continued)

(52) U.S. Cl.
CPC ... *H04N 21/8358* (2013.01); *H04N 21/21805* (2013.01); *H04N 21/2365* (2013.01);
(Continued)

(58) Field of Classification Search
CPC ......... H04N 21/21805; H04N 21/2365; H04N 21/8358; H04N 21/8106; H04N 21/8541; H04N 21/23892
See application file for complete search history.

(56) References Cited

U.S. PATENT DOCUMENTS

| 6,122,610 A | 9/2000 | Isabelle |
| 6,145,081 A | 11/2000 | Winograd et al. |

(Continued)

FOREIGN PATENT DOCUMENTS

| JP | 2004163855 | 6/2004 |
| JP | 2004173237 | 6/2004 |

(Continued)

OTHER PUBLICATIONS

Aris Technologies, Inc. "Audio Watermarking System to Screen Digital Audio Content for LCM Acceptance," May 1999 (17 pages).

(Continued)

*Primary Examiner* — Chenea Davis
(74) *Attorney, Agent, or Firm* — Perkins Coie LLP; Donald L. Wenskay

(57) ABSTRACT

The disclosed embodiments relate to methods, devices and computer program products that enable watermark-based metadata recovery for content with multiple alternative components. The content can, for example, be included in broadcast television services which include multiple alternative audio and video components, only a subset of which may be presented by a given receiver at a given time. The disclosed techniques, among other features, enable broadcasters to deliver different services to different customers by using different watermarks into the feeds they provide to multichannel video program distributors (MVPDs). For instance, coincident audio and video components are embedded with different watermark payloads.

27 Claims, 8 Drawing Sheets

(51) Int. Cl.
*H04N 21/2365* (2011.01)
*H04N 21/2389* (2011.01)
*H04N 21/81* (2011.01)
*H04N 21/8541* (2011.01)

(52) U.S. Cl.
CPC ... *H04N 21/23892* (2013.01); *H04N 21/8106* (2013.01); *H04N 21/8541* (2013.01)

(56) References Cited

U.S. PATENT DOCUMENTS

| | | |
|---|---|---|
| 6,175,627 B1 | 1/2001 | Petrovic et al. |
| 6,427,012 B1 | 7/2002 | Petrovic |
| 6,430,301 B1 | 8/2002 | Petrovic |
| 6,683,958 B2 | 1/2004 | Petrovic |
| 6,792,542 B1 | 9/2004 | Lee et al. |
| 6,888,943 B1 | 5/2005 | Lam et al. |
| 6,931,536 B2 | 8/2005 | Hollar |
| 7,024,018 B2 | 4/2006 | Petrovic |
| 7,159,118 B2 | 1/2007 | Petrovic |
| 7,224,819 B2 | 5/2007 | Levy et al. |
| 7,460,667 B2 | 12/2008 | Lee et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,085,935 B2 | 12/2011 | Petrovic |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,533,481 B2 | 9/2013 | Petrovic et al. |
| 8,538,066 B2 | 9/2013 | Petrovic et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,923,548 B2 | 12/2014 | Petrovic et al. |
| 9,009,482 B2 | 4/2015 | Winograd |
| 9,055,239 B2 | 6/2015 | Tehranchi et al. |
| 9,106,964 B2 | 8/2015 | Zhao |
| 9,117,270 B2 | 8/2015 | Wong et al. |
| 2007/0039018 A1 | 2/2007 | Saslow et al. |
| 2007/0220265 A1 | 9/2007 | Lemma et al. |
| 2011/0261667 A1 | 10/2011 | Ren et al. |
| 2011/0293090 A1 | 12/2011 | Ayaki et al. |
| 2011/0320627 A1 | 12/2011 | Landow et al. |
| 2012/0023595 A1 | 1/2012 | Speare et al. |
| 2012/0072731 A1 | 3/2012 | Winograd et al. |
| 2012/0102304 A1 | 4/2012 | Brave |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0297727 A1 | 11/2013 | Levy |
| 2014/0067950 A1 | 3/2014 | Winograd |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0237628 A1 | 8/2014 | Petrovic |
| 2014/0267907 A1 | 9/2014 | Downes et al. |
| 2014/0270337 A1 | 9/2014 | Zhao et al. |
| 2014/0270338 A1* | 9/2014 | Zhao ............... G06T 1/0021 382/100 |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0121534 A1 | 4/2015 | Zhao et al. |
| 2015/0261753 A1* | 9/2015 | Winograd ............ G06F 16/434 707/736 |

FOREIGN PATENT DOCUMENTS

| | | |
|---|---|---|
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 1020120128149 | 11/2012 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |
| WO | 2010135687 | 11/2010 |
| WO | 2011116309 | 9/2011 |
| WO | 2013163921 | 11/2013 |

OTHER PUBLICATIONS

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Kalker, T., et al., "System issues in digital image and video watermarking for copy protection," Proc. IEEE Int. Conf. on Multimedia Computing and Systems, pp. 562-567, Jun. 1999.

Kirovski, D., et al., "Multimedia content screening using a dual watermarking and fingerprinting system," Proceedings of the tenth ACM international conference, pp. 372-381, 2002.

Kirovski, D., et al., "Multimedia content screening using a dual watermarking and fingerprinting system," MULTIMEDIA '02 Proceedings of the tenth ACM international conference on Multimedia, 2002 (11 pages).

(56) References Cited

OTHER PUBLICATIONS

Verance Corporation, "Confirmedia," PowerPoint presentation made to National Association of Broadcasters, Apr. 24, 2001 (40 pages).
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).
International Search Report and Written Opinion for International Patent Application No. PCT/US2016/043199, dated Oct. 26, 2016 (15 pages).

* cited by examiner

| Component | 0..N | | Description of a coincident watermark segment carried in a audio or video component of the content |
|---|---|---|---|
| @componentServerCode | 0..1 | xs:string | The server code value carried in the coincident watermarked segment. If not present, the implied value is @serverCode. |
| @componentIntervalCodeAnchor | 0..1 | xs:string | An interval code value carried in the coincident watermarked segment. If not present, the implied value is @intervalCode. |
| @componentTimeAnchor | 0..1 | xs:string | The "Plant" UTC time of the starting cell boundary (for audio) or message block boundary (for video) of the VP1 payload carrying the server code @componentServerCode and the interval code @componentIntervalCode. |
| @componentType | 1 | xs:string | The media type of the described component. Defined values: "audio", "video" |
| @componentDescriptor | 0..1 | xs:string | A descriptor of the component. This can be aligned with signaling from the service/audio/video layers and in a format which can be interpreted by the receiver e.g. "primary video", "alternate camera view", "primary audio", "video descriptive service audio", "spanish language audio", etc. or alternatively it can be a free text field intended for consumption by an interactive application. |
| @componentRecoveryDataPriority | 0..1 | xs:int | The relative priority of the recovery data indicated in the watermark payload of the described component. Recovery data indicated in presentation components with larger priority values shall take precedence over that of presentation components with lower priority values. When no priority is indicated, the default priority of a component is 0. |

FIG. 3

WATERMARK-BASED DATA RECOVERY FOR CONTENT WITH MULTIPLE ALTERNATIVE COMPONENTS

CROSS REFERENCE TO RELATED APPLICATIONS

This patent application claims the benefit of U.S. Provisional Patent Application No. 62/194,756, filed Jul. 20, 2015. The entire content of the before-mentioned patent application is incorporated by reference as part of the disclosure of this application.

TECHNICAL FIELD

The subject matter of this patent document generally relates to the field of content management. More particularly, the disclosed embodiments relate to watermark-based techniques for signals for enhancing metadata recovery.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, can include a series of related images, which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, and other sources.

A multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. One technique for identifying a content uses watermarks that are embedded into a multimedia content (e.g., in the audio or video portions). The watermarks carry information that can be used for automatic content recognition (ACR) of audio, images, video or audiovisual content.

SUMMARY OF CERTAIN EMBODIMENTS

The disclosed embodiments relate to techniques that enable watermark-based metadata recovery for content with multiple alternative components. This content may be included in broadcast television services which include multiple alternative audio and video components, only a subset of which may be presented by a given receiver at a given time. The disclosed techniques, among other features, enable broadcasters to deliver different services to different customers by using different watermarks into the feeds they provide to the MVPDs. For instance, coincident audio and video components are embedded with different watermark payloads.

One aspect of the disclosed embodiments relates to a method for enhancing presentation of a broadcast content that is associated with multiple alternate segments. Such a method includes detecting a plurality of watermark payload values from coincident segments of a broadcast content received at a receiver device, wherein at least a first coincident segment includes a first watermark payload value that is different from a second watermark payload value detected from a second coincident segment. The plurality of watermark payload values can be detected using a watermark extractor that is at least partially implemented in hardware. The method further includes initiating transmission of a request for a recovery table from a database for each of the first and the second watermark payload values, and receiving the recovery table or tables. The method also includes processing the recovery table or tables to determine, for each of the first and the second watermark payload values, (1) a descriptor that characterizes the coincident segment from which the first or the second watermark payload value was detected, and (2) a priority value, and based at least on the descriptor and the priority value associated with each of the first and the second watermark payload values, enabling presentation of a secondary content that conforms to the descriptor of the second watermark payload value, or enabling modification of a user interface for presentation of the broadcast content.

Another aspect of the disclosed embodiments relates to a device that includes a processor, and a memory including processor executable code. The processor executable code, when executed by the processor, causes the device to detect a plurality of watermark payload values from coincident segments of a broadcast content received at the device, wherein at least a first coincident segment includes a first watermark payload value that is different from a second watermark payload value detected from a second coincident segment. The processor executable code, when executed by the processor, also causes the device to initiate transmission of a request for a recovery table from a database for each of the first and the second watermark payload values, and to receive the recovery table or tables. The processor executable code, when executed by the processor, further causes the device to process the recovery table or tables to determine, for each of the first and the second watermark payload values, (1) a descriptor that characterizes the coincident segment from which the first or the second watermark payload value was detected, and (2) a priority value, and, based at least on the descriptor and the priority value associated with each of the first and the second watermark payload values, enable presentation of a secondary content that conforms to the descriptor of the second watermark payload value, or enable modification of a user interface for presentation of the broadcast content.

Another aspect of the disclosed embodiments relates computer program product, embodied on one or more non-transitory computer readable media, that includes program code for detecting a plurality of watermark payload values from coincident segments of a broadcast content received at a receiver device, wherein at least a first coincident segment includes a first watermark payload value that is different from a second watermark payload value detected from a second coincident segment. The computer program product also includes program code for initiating transmission of a request for a recovery table from a database for each of the first and the second watermark payload values, and program code for receiving the recovery table or tables. The computer program product further includes program code for processing the recovery table or tables to determine, for each of the first and the second watermark payload values, (1) a descriptor that characterizes the coincident segment from which the first or the second watermark payload value was detected, and (2) a priority value, as well as program code for, based at least on the descriptor and the priority value associated with each of the first and the second watermark payload values, enabling presentation of a secondary content that conforms to the descriptor of the second watermark payload value, or enabling modification of a user interface for presentation of the broadcast content.

Further details of the various disclosed embodiments are provided in the sections that follow.

BRIEF DESCRIPTION OF THE DRAWINGS

FIG. 3 illustrates different fields of a component structure that identifies watermarks and associated characteristics for alternate content segments in accordance with an exemplary embodiment.

DETAIL DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One application of the disclosed embodiments relates to automatic content recognition and recovery of metadata associated with multimedia content. Such a multimedia content can, for example, be ATSC 3.0 broadcast content that uses a watermarking system that conforms to the requirements set forth in the Advanced Television Systems Committee (ATSC), Inc., Call for Proposals For ATSC-3.0 AUTOMATIC CONTENT RECOGNITION WATERMARKING SOLUTIONS—ATSC Technology Group 3 (ATSC 3.0) ("ATSC CfP), which is incorporated herein by reference.

Metadata carried in multimedia content enabling advanced features (e.g., interactivity and dynamic advertisements) in a client device (e.g., TV or tablet) can get lost after redistribution of the content by, for example, a multichannel video program distributor (MVPD). Such a loss of metadata can, for example, be due to content reformatting, transcoding or other types of processing. For example, the meta data can be lost when a content that is delivered to a set-top box and then provided to a television set via an HDMI interface, ACR can be used to recover such timed metadata from the content after redistribution of the content in order to enable those advanced features. Both audio and video watermarking techniques have been proposed to identify the content and the current temporal position of the content being reviewed in order to recover the timed metadata.

Figure 1:
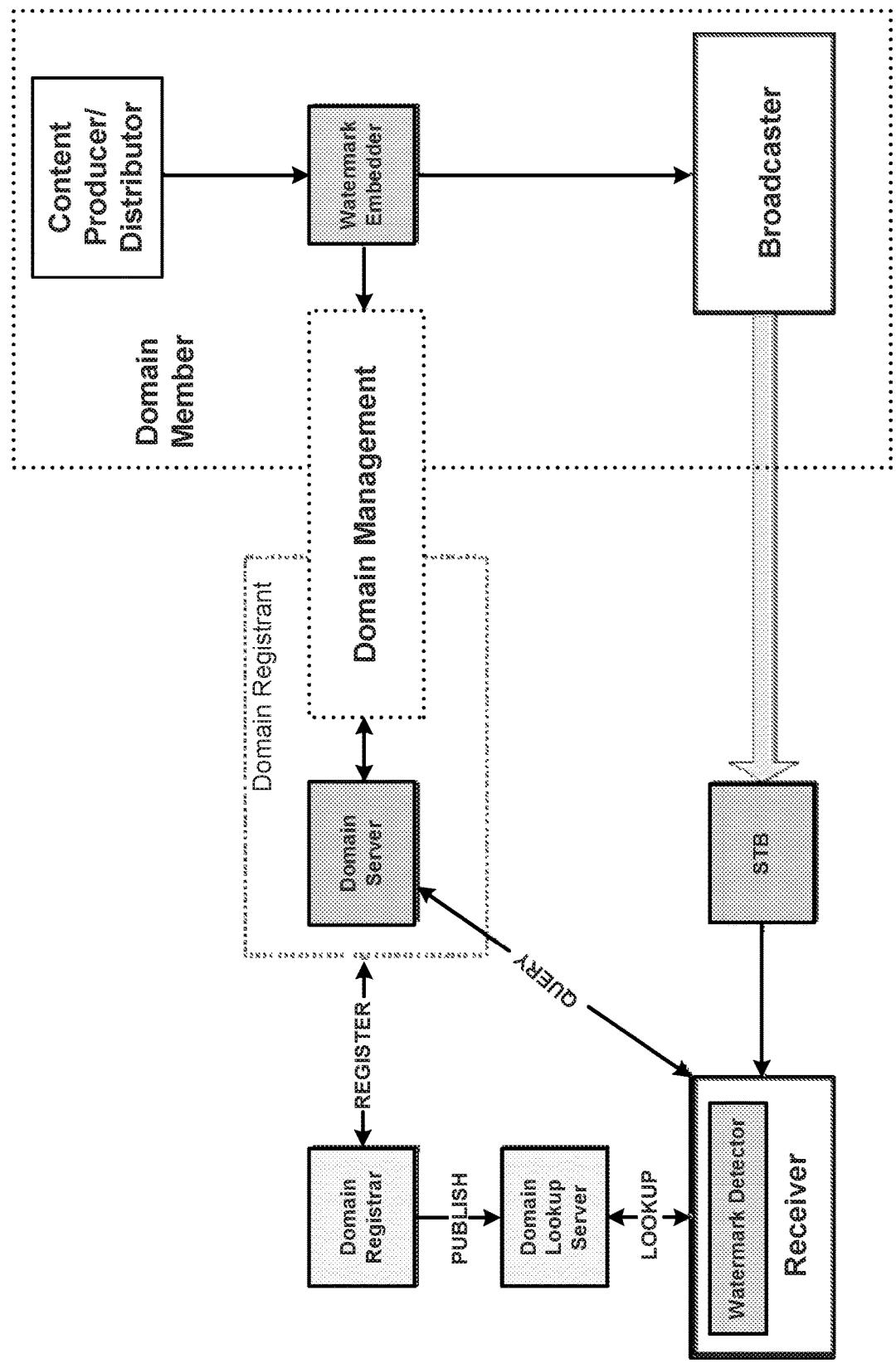
FIG. 1 illustrates an example of a system that conforms to ATSC 3.0 requirements for using watermarks that are embedded in a content to enable ACR.

FIG. 1 illustrates an example of a system that conforms to ATSC 3.0 requirements for using watermarks that are embedded in a content to enable ACR. In the depicted scenario of FIG. 1, the content is provided to a set-top box (or similar device) at consumers' homes. The content that comes from the set-top box (typically via a HDMI interface) is presented on a viewing device ("Receiver") that is compliant with ATSC 3.0 standard. The uncompressed audio/video at the viewing device includes embedded watermarks that enables the identification of the content and the current position of the content being viewed. The identified content and the current temporal position of the content are used to recover the metadata that enables the viewing device to receive additional contents, services or features associated with the presented content. The receiver (sometime also referred to as a receiver device) can be a separate component than the set-top box, or the receiver device may include, or be part of a, larger device that includes any one or combinations of additional components such as a set-top box a display, keyboard or other user interface devices, or a watermark detector, as well as processors (e.g., microprocessors, digital signal processors (DSPs), etc.) and other circuitry that may be needed for implementation of such device, or devices.

Referring to FIG. 1, the content is embedded with watermarks by a Domain Member prior to broadcast. For example, such a Domain Member can be a content producer or a Broadcaster. A Broadcaster transmits the content to one or more user premises. Such content is often received at a receiver such as a set top box (STB), where decompression and formatting operations may take place before the content is provided to the Receiver. Decompression and formatting may alternatively take place within the Receiver. The Receiver which includes a watermark detector, examines the received content for the presence of watermarks. The detection of watermarks may trigger further actions such as identifying a domain name associated with the detected watermark payload and sending a query to an identified domain server.

The Domain Registrar in FIG. 1 is a unique centralized entity responsible for registering Domain IDs and publishing the mapping between Domain IDs and domain names to Domain Lookup Servers. Domain registration is a process wherein a Domain ID is uniquely assigned to a Domain Registrant entity. The Domain Registrar provides Domain Registrant with a process (e.g., designated as REGISTER in FIG. 1) to establish and maintain the relationship between the Domain ID and a domain name (e.g., Internet format). Multiple Domain IDs may be mapped to the same domain name. The Domain Registrar further maintains a database of all mappings from Domain IDs to domain names. The Domain Registrar employs a standardized protocol (e.g., designated as PUBLISH in FIG. 1) to publish new and modified domain mappings to Domain Lookup Services that can include Domain Lookup Servers, as well as any other devices that may be needed to implement Domain Lookup Services. This protocol used by the Domain Registrar enables interoperability between the central Domain Registrar and all Domain lookup services. In some implementations, support for PUBLISH protocol is mandatory on both the Domain Lookup Servers and the Domain Registrar.

Referring again to FIG. 1, Domain Registrants are responsible for coordinating the use of Sequence IDs in watermarks by one or more Domain Members. The Domain Registrant may be a member of its domain. The Domain Registrant is also responsible for registering a domain name (to be associated with its assigned Domain ID) with the Domain Registrar.

Domain Lookup Server(s) maintain a copy of the Domain Registration database which maps each registered Domain ID to a domain name and keeps it current using the PUBLISH protocol with the Domain Registrar. Domain Lookup Server(s) also employ a standardized protocol (e.g., designated as LOOKUP in FIG. 1) to provide domain name mappings from the database in response to Domain ID lookup queries originated by the Receivers. The use of a standardized LOOKUP protocol facilitates interoperability between any Receiver and any Domain Lookup Server, but does not need to be mandatory on either the Receivers or Domain Lookup Server(s) because a Receiver manufacturer can direct all lookup queries from devices that they manufacture to a private Domain Lookup Service and employ a non-standard protocol to do so. The Receivers can be ATSC-compatible or ATSC-complaint. That is, those receivers comply with ATSC requirements, such as those under ATSC 3.0.

Domain Servers are Internet servers that are accessible at the domain name associated with a registered Domain ID and can provide metadata to Receivers in response to queries triggered by watermark detections. Queries can employ a standardized message protocol (e.g., designated as QUERY in FIG. 1). A query can be initiated by a Receiver and provides the domain server with a Domain ID and Sequence ID. The Domain Server responds with available metadata (e.g. broadcast channel identifier, a broadcast segment identifier, a timecode, a signaling) associated with the provided Domain ID and Sequence ID. Domain servers are not required to provide data for all required data fields available for all queries. Support for the QUERY protocol by all Receivers and Domain Servers enables interoperability among all receivers and content. This protocol enables interoperability between all receivers and all domain servers and support may be mandatory on both the receivers and the domain servers. Domains are managed via coordinated interaction between a Domain Registrant and Domain Members (entities within a domain). Domain Management includes allocation of Sequence IDs within the domain to Domain Members, assignment of Sequence IDs to content segments, management of Sequence ID usage by watermark embedders, and/or distribution of metadata associated with Sequence IDs to Domain Servers.

Figure 2:
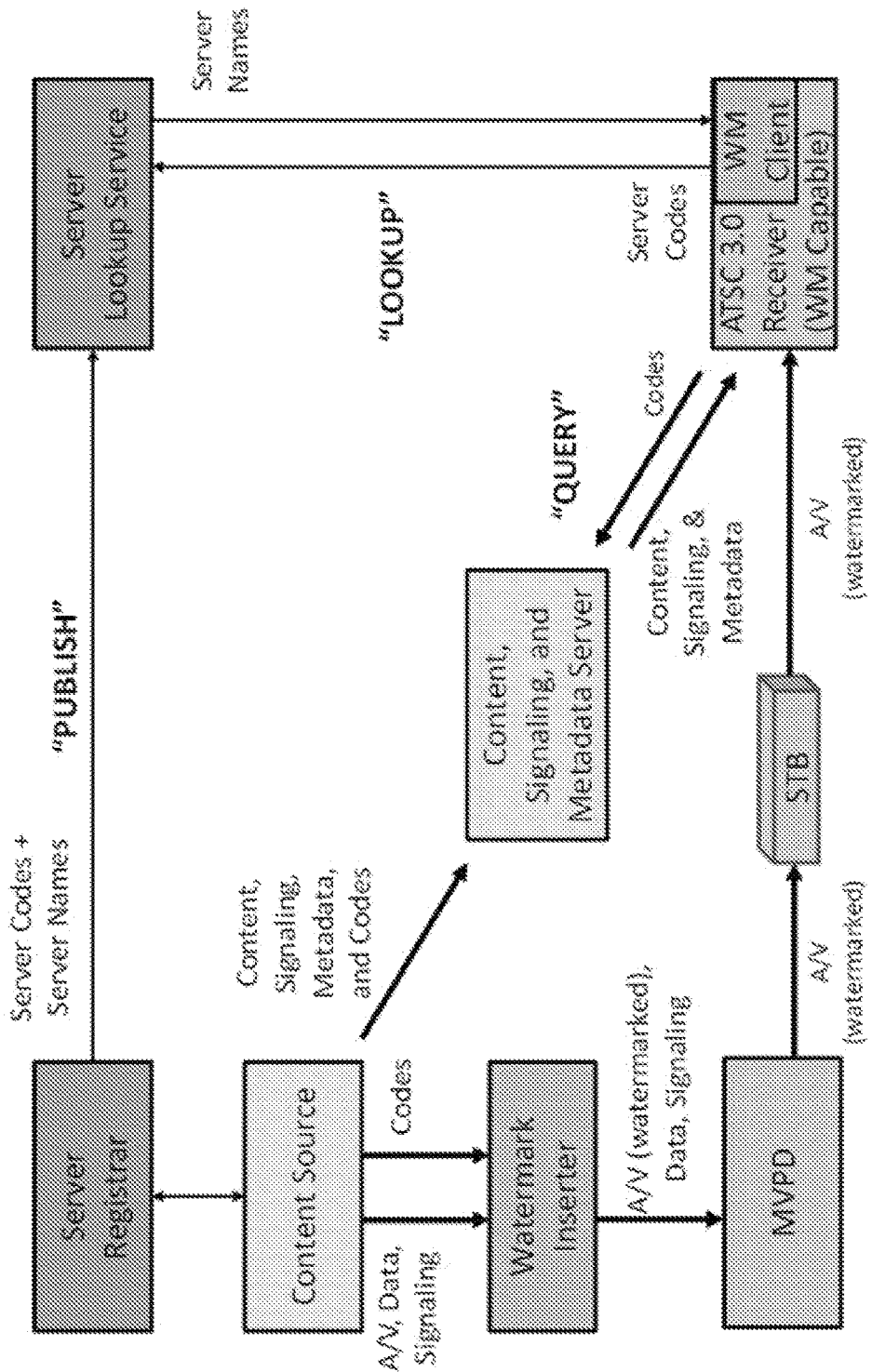
FIG. 2 provides another illustration of a system that is compatible with the requirements of ATSC 3.0.

FIG. 2 provides another illustration of a system that is compatible with the requirements of ATSC 3.0. Similar to the previously describes watermark payload structure, what is known as a VP1 watermark, which includes a Server Code and an Interval Code (and can further include a Trigger field). The Server Code is a value which is registered with a central authority designated by a Server Registrar (e.g., ATSC) that provides a mechanism for dividing the watermark code space among independent code-issuing entities (e.g., Server Registrants). For example, a Server Code can be registered by a content producer that wants to manage and use codes within content that they produce, a network that wants to manage and use codes within content that they distribute, or a service provider that wants to manage interactive services on their behalf. These independent code-issuing entities are sometimes referred to as "ATSC Domains" because the Server Code can also provide a one-to-one mapping to an Internet domain. The domain identifiers are recorded by the Server Registrar, are published to Server Lookup Services which maintain copies of the registration database, and can be accessed by receivers to discover the Internet domain name at which they can access servers hosting metadata associated with content embedded with that Server Code.

The Server Registrant is responsible for coordinating the management of all Interval Codes associated with their assigned Server Code. Each Interval Code value can be associated uniquely with a specific interval of an instance of broadcast content. In audio implementations of the watermarking system, the interval is equal to the watermark duration (e.g., 1.5 seconds) but can be longer in circumstances where there is no need to enable a receiver to identify timing within the interval. The range of codes defined by an assigned Server Code and all associated Interval Codes are referred to as a Code Domain. The Trigger field of the VP1 watermark is a Boolean signal from the Content Source to the ATSC Receiver indicating that the ATSC Receiver should query for new interactive service content.

It should be noted that several components that are shown in FIG. 2 can find analogous counterparts in FIG. 1. For example, the Server Registrar and the Domain Registrar; the Content, Signaling and Metadata Server and Domain Server; and the Server Lookup Service/server and Domain Lookup Server can carry out analogous operations. The various components in FIG. 2 are further described below. A Server Registrar is established by ATSC for the purpose of registering ATSC Domains and assigning to each a unique Server Code. Registrants inform the registrar of a Server Name, which is the Internet domain name or URL at which metadata services associated with the Code Domain are located. The Server Registrar publishes the Server Code and associated Server Name to the Server Lookup Services.

One or more Server Lookup Services are established. These services may be operated by ATSC, the Server Registrar, Content Owners, ATSC Receiver manufacturers, or a third party. Each Server Lookup Service maintains a database of all Server Code/Server Name associations published by the Server Registrar and responds to lookup requests from ATSC Receivers. The Server Lookup Services do not need to access or store any broadcast metadata; they simply provide ATSC Receivers with access to Server Names associated with Server Codes detected from broadcast watermarks.

A Content Source, acting either as a Server Registrant or in concert with a Server Registrant, associates a valid registered Server Code and one or more unique Interval Codes and maps them to intervals of broadcast content essence. The Content Source embeds those codes in the broadcast content using a Watermark Inserter prior to delivery of the broadcast content to an MVPD. The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server"). Content Sources may associate and embed watermarks continuously throughout their program material using sequentially increasing Interval Codes, may embed watermarks only in those intervals of content where interactive services are enabled, or may embed an Interval Code repeatedly through a program segment where an interactive service is available but does not require timing precision. Content Sources may register additional Code Domains in advance of depleting the Interval Code space associated with a given Server Code and may associate newly assigned Server Codes with the same Internet domain name to maintain infrastructure continuity.

The CSM Server responds to various requests from ATSC Receivers, including delivery of signaling and interactive content based on interactive service data received from a complete broadcast stream. The CSM Server also responds to code metadata queries, in which a query containing the watermark payload (e.g. in the ASCII representational format) is submitted by the WM Client in an ATSC Receiver, with a request for metadata associated with the interval of broadcast content. The metadata included in the CSM Server response may include channel identifiers, timecodes, content or segment identifiers, triggers, etc.; these are referred to as the "information to convey" in the ATSC CfP.

ATSC Receivers may obtain broadcast content essence absent the full ATSC broadcast stream from an MVPD via a STB. The ATSC receiver may provide the content essence to the watermark client for detection of any embedded codes. As part of watermark client implementation in a given product, associations between Server Codes and Server Names can be stored in a cache (e.g., memory device), but it can also include the Internet address of a Server Lookup Service so that it may lookup newly registered or modified Server Names. The cache may be pre-populated at the time at ATSC Receiver manufacture to reduce traffic to Server Lookup Services.

When the watermark client detects a watermark payload embedded in the content it is playing, it checks to see whether or not the detected Server Code is present in its cache. If it is, the watermark client queries the CSM Server whose Server Name is associated with the Server Code to obtain the metadata associated with the detected watermark payload. If the Server Code from the detected watermark is not present in its cache, or if the contacted server fails to respond as expected, the watermark client may look up the current Server Name associated with the Server Code from the Server Lookup Service, cache the result, and then initiate a query directed at the newly identified Server Name.

Watermark clients may be configured to initiate a query only for certain watermark detections; e.g. the first one after playback begins, the first one after a channel change, only those with the Trigger field set if a query has not been performed within the past, e.g., 30 seconds, etc. Timecode metadata provided to watermark clients by the CSM Server can be used in conjunction with data recovered from the watermark detection process to determine the original media timecode of the broadcast content with frame or millisecond accuracy.

To enable the architecture that is depicted in FIG. 2, open standards can be provided for the following three network protocols: PUBLISH, LOOKUP, and QUERY. PUBLISH is a protocol whereby the Server Registrar notifies interested ecosystem participants of a newly established or updated mapping between a Server Code and an Internet domain name and publishes the association to Server Lookup Services. LOOKUP is a protocol whereby an ATSC Receiver can submit a Server Code to a Server Lookup Service and receive a response containing the associated Server Name which has been most recently published by the Server Registrar. QUERY is a protocol whereby an ATSC Receiver can submit a Server Code and Interval Code to a CSM Server and receive ATSC metadata (e.g. channel, timecode, interactive services triggers, etc.) associated with the specified interval of broadcast content.

The CfP further describes a scenario in its FIG. 2, where the associated architecture relies on having receivers programmed to access a metadata server designated by receiver manufacturer with all of their watermark-related requests. The disclosed architecture of the present application supports the use of this approach by receiver manufacturers who wish to employ such a model. In such an arrangement, (where the italicized terminology is taken from FIG. 2 of the CfP) the code DB and metadata server can be populated by any metadata server operator with access to the full broadcast stream for all broadcasters in a region. The same service provider can perform watermark detection and metadata recovery from the broadcast stream to populate their Code DB for use by the metadata server. Since the watermark specification is open, the Content Source need not use a Watermark Inserter affiliated with any particular metadata server operator and any metadata sever operator can recover the watermarks embedded by any broadcaster.

As a very specific example, the code DB and the Content and Signaling Server can be populated by any automatic content recognition (ACR) service provider with access to the full broadcast stream for all broadcasters in a region. The ACR service provider can perform watermark detection and metadata recovery from the broadcast stream to populate their Code DB for use by the Content and Signaling Server. Since the watermark specification is open, the Content Source need not use a Watermark Inserter affiliated with any particular ACR service provider and any ACR service provider can recover the watermarks embedded by any broadcaster.

ATSC receivers within such a closed ecosystem need not employ the LOOKUP or QUERY protocols and can instead rely on the private protocols for accessing services within this private ecosystem created by the metadata server operator (e.g., by the ACR service provider). Such receivers can seamlessly coexist alongside other ATSC receivers that employ the standardized protocols and infrastructure that is described in the present application.

In the context of such exemplary ATSC 3.0-compatible systems, the description that follows uses broadcast television as an example of a type of content that can include multiple alternate components. However, it is understood that the techniques disclosed herein are applicable to other types of content w alternate components. Moreover, in this document, the term "stream" is used to describe a program component which is a complete presentation, such as a full screen video program or a multichannel audio program, as distinct from a video inset or overlay or an audio substream, channel or object.

Broadcast television services may include multiple alternative audio and video components, only a subset of which may be presented by a given receiver at a given time. Examples of this include:

(1) A broadcast service includes multiple alternative video components from which a viewer can choose, such as camera angles or locations (e.g. normal, skycam, or helmet cam for a sports broadcast).

(2) A broadcast service includes multiple alternative audio components from which a viewer can choose, such as one with English language dialog or Spanish language dialog.

(3) A broadcast service's content can be delivered in modified form over different distribution paths, e.g., with different advertisements or program features depending on which MVPD they subscribe to.

If the broadcast service employs an interactive component, it is useful if that interactivity can be tailored based on the particular combination of service components which the viewer is displaying. For example, in use case 1 described above, the on-screen placement of overlay text may beneficially vary based on the composition of the video component displayed to avoid obscuring important areas of the video. In use case 2 described above, the language used for displaying on-screen overlay text might beneficially match the language of the selected dialog. In use case 3 described above, the types of interactivity offered may beneficially be tailored to accord with a particular agreement between the broadcast service provider and the MVPD.

In the above example, the usage of the content can be enhanced, if the receiver which obtains the broadcast service over-the-air, can identify the available service components, manage the selection, and enable interactivity to be tailored to the individual component. When an MVPD or other redistribution service is interposed between the broadcast service and the receiver, the selection of which components are presented can occur upstream from the receiver which presents the interactivity. The disclosed techniques, among other features, enable receivers to determine which components have been selected using the ATSC audio and video watermarks.

To enable such features, in some embodiments, coincident audio or video components of a content are marked with different watermark payloads. One example, of such a watermark is called VP1 watermark which was mentioned earlier in this document. In case of audio, the payload of the VP1 watermark is transmitted in successive, adjacent 1.5 second intervals. In the case of video, the VP1 payload is transmitted in successive message blocks of ⅙ second duration transmitted every 1.5 seconds. Further details of VP1 audio watermark is described in "ATSC Candidate Standard: Audio Watermark Emission (A/334)" (http://atsc.org/wp-content/uploads/2015/12/S33-160r1-Audio-Watermark-Emission.pdf), and details of VP1 video watermark is described in "ATSC Candidate Standard: Video Watermark Emission (A/335)" (http://atsc.org/wp-content/uploads/2015/12/A335S33-156r3-Video-Watermark-Emission.pdf)," the content of which are incorporated by reference.

In the disclosed embodiment that embed a different payloads of the VP1 watermark into alternate contents, each marked component carries only a single VP1 payload in a watermark segment. Broadcasters publish recovery data for all VP1 payloads embedded in any component of a broadcast service. The recovery data table structure is also expanded to include a new Component structure which can be used to provide the receiver with information about the various coincident watermark segments. An exemplary format of the this new Component structure is shown in the table of FIG. 3, as further described below.

Receivers which detect a watermark in content, can query a broadcaster server as previously described to obtain the recovery data table associated with the detected watermark. If a complete Component structure is included in the recovery data, the receiver is made aware of all other watermarked components which may also be associated with the broadcast service and their alignment to the current segment.

Information contained in the Component structure can be used by the receiver to, for example, tailor its interactive presentation of content. With reference to the table in FIG. 3, the first two entries describe the server code and the interval code values that are carried in the coincident watermark component. The time anchor value identifies the starting boundary of the VP1 watermark (having the server code value), and the component type identifies the type of component. The descriptor field provides a description of the component. For example, if the Component structure contains a descriptor associated with a detected watermark payload which identifies an audio component in which the payload was detected as containing Spanish language dialog, the receiver can adjust its user interface presentation to use Spanish. Alternately, the receiver can make the descriptor available for processing by an interactive application associated with the content and the interactive application can tailor its presentation to the descriptor information (e.g. present the interactive user interface in Spanish).

Figure 4:
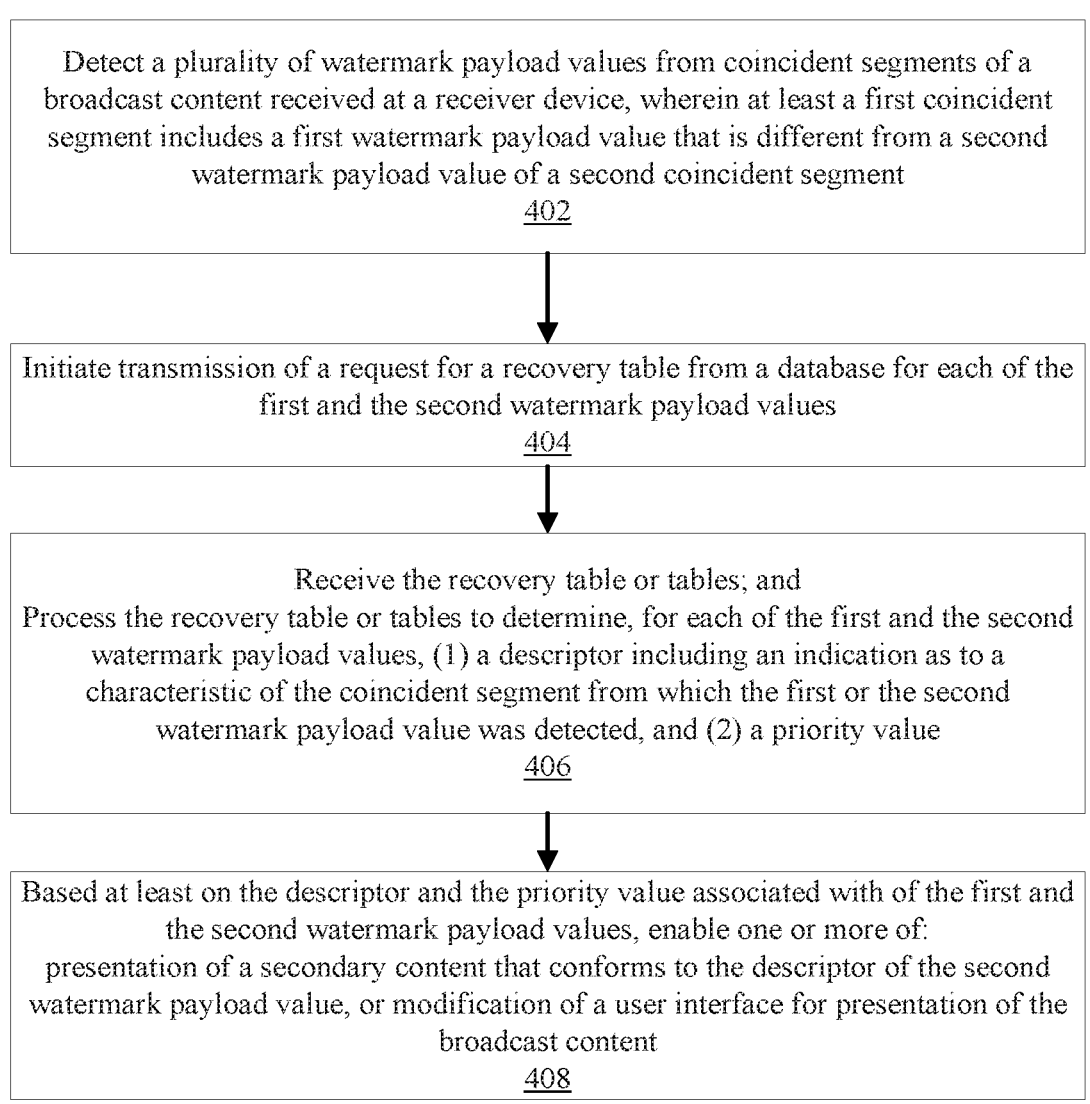
FIG. 4 illustrates a set of exemplary operations that can be carried out at a receiver device to utilize coincident watermarked segments to improve presentation of a content in accordance with an exemplary embodiment.

FIG. 4 illustrates a set of exemplary operations that can be carried out at a receiver device to utilize coincident watermarked segments to improve presentation of a content in accordance with an exemplary embodiment. At 402, a plurality of watermark payload values are detected from coincident segments of a broadcast content received at a receiver device, where at least a first coincident segment includes a first watermark payload value that is different from a second watermark payload value of a second coincident segment. The watermarks can be detected using a watermark detector that is implemented at least partially in hardware. At 404, transmission of a request for a recovery table from a database is initiated. Such a request is for each of the first and the second watermark payload values. At 406, the recovery table or tables are received, and processed to determine, for each of the first and the second watermark payload values, (1) a descriptor including an indication as to a characteristic of the coincident segment from which the first or the second watermark payload value was detected, and (2) a priority value. Some examples of the descriptor are provided in the table of FIG. 3. At 408, based at least on the descriptor and the priority associated with of the first and the second watermark payload values, one or more of the following are enabled: presentation of a secondary content that conforms to the descriptor of the second watermark payload value, or modification of a user interface for presentation of the broadcast content.

In some embodiments, the second coincident segment is one of a plurality of alternate segments of the broadcast content, each alternate segment being coincident in time with the second coincident segment, and at least one of the alternate segments includes a watermark payload value that is different the second watermark payload value. In one exemplary embodiment, the plurality of alternate segments include two or more audio segments. In another exemplary embodiment, the descriptor of the second watermark payload value indicates that the second coincident segment is associated with a particular language. In such embodiment, enabling modification of the user interface can include modifying an audio interface component to allow playback of audio in the particular language. In yet another exemplary embodiment, the descriptor of the second watermark payload value indicates that the second coincident segment is associated with a particular language, and enabling presentation of a secondary content includes initiating a request for presentation of the secondary content that is in the particular language.

According to some embodiments, the descriptor of the first watermark payload value indicates that the first coincident segment is a primary video segment, and the descriptor of the second watermark payload value indicates that the second coincident segment is an additional video segment. Further, enabling modification of the user interface can include tailoring the user interface to become compatible with presentation of the additional video segment. In one exemplary embodiment, the descriptor of the first watermark payload value or the descriptor of the second watermark payload value is indicative of one of the following: a primary video, an alternate camera view, a primary audio, a video descriptive audio source, a foreign language audio, a helmet camera video, or a text information for consumption by an interactive application. In still another exemplary embodiment, upon a determination that one of the priority values associated with the first watermark payload value or the second watermark payload has a higher priority value, information associated with the higher-valued priority value is used for enabling presentation of the secondary content, or for enabling modification of the user interface.

Information contained in the Component structure can be used by the watermark client in order to aid watermark detection effectiveness and/or efficiency. For example, if the receiver first detects a video mark, it may obtain an associated recovery data table identifying an associated watermarked audio component. The payload data and its alignment relative to the "plant" time reference are given so as to allow the receiver to determine what VP1 payload is present at any time in any coincident component. In particular, the receiver knows the time in the received content where it recovered the initial watermark payload and can use the anchor data from the recovery data table to determine the mapping between that time and the associated "plant" UTC time. It can then perform the inverse calculation for each other coincident component described in the recovery data table to determine its next payload interval starting boundary time and payload value in the received content, and can seek to detect those values on an informed basis e.g. via hypothesis testing rather than blind detection. This information can be used to inform and optimize the receiver's efforts to recover the audio watermark.

Figure 5:
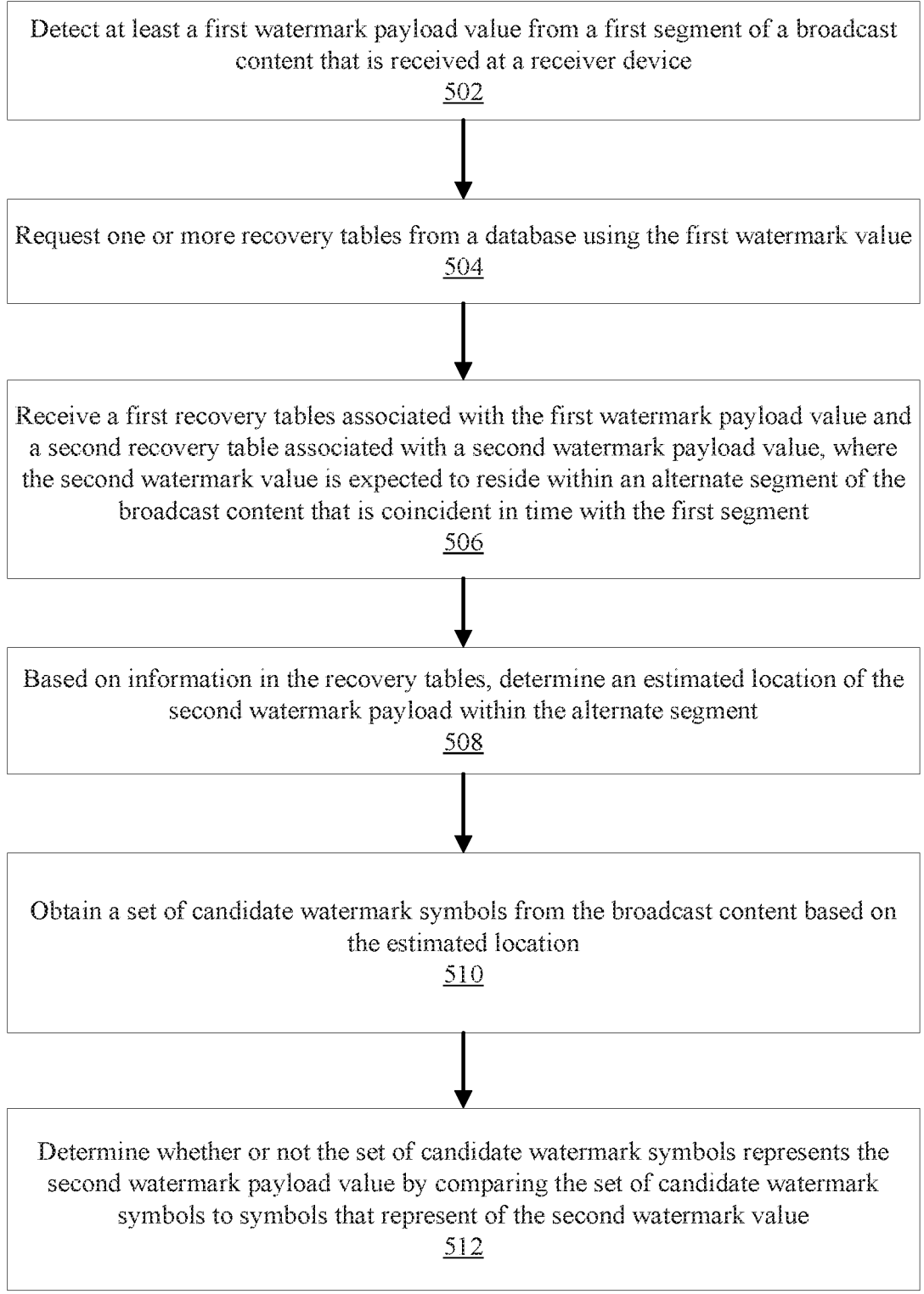
FIG. 5 illustrates a set of exemplary operations that can be carried out at a receiver device to utilize coincident watermarked segments to improve detection of watermarks from a content in accordance with an exemplary embodiment.

FIG. 5 illustrates a set of exemplary operations that can be carried out at a receiver device to utilize coincident watermarked segments to improve detection of watermarks from a content in accordance with an exemplary embodiment. At 502, at least a first watermark payload value is detected from a first segment of a broadcast content that is received at a receiver device. Watermark detection can be carried out using a watermark detector that is implemented at least in part in hardware. At 504, one or more recovery tables are requested from a database using the first watermark value. At 506, a first recovery tables associated with the first watermark payload value and a second recovery table associated with a second watermark payload value is received, where the second watermark payload value is expected to reside within an alternate segment of the broadcast content that is coincident in time with the first segment. At 508, based on information in the recovery tables, an estimated location of the second watermark payload within the alternate segment is determined. As noted above, this location can be a starting boundary of the second watermark payload within the alternate segment. At 510, based on the estimated location, a set of candidate watermark symbols are obtained from the broadcast content. At 512, it is determined whether or not the candidate set of watermark symbols represents the second watermark payload value. Such a determination can be accomplished by comparing the set of candidate watermark symbols to symbols that represent of the second watermark value.

The symbols that represent of the second watermark value can be constructed based on the value of the second watermark payload that is in the second recovery table. As noted above, when the value of the watermark payload becomes known prior to the actual detection of the watermark, the candidate payload symbols obtained from the broadcast content can be subject to hypothesis testing to determine whether or not they form a valid watermark payload. This technique, as opposed to blind detection based on an unknown payload value, enhances watermark detection capability because it improves the detection robustness (e.g., the number of errors that can be tolerated in a watermark payload) for a given level of watermark detection reliability. Alternatively, this technique allows for robustness of detections to be maintained the same as in blind detection while providing a higher reliability of watermark detections.

In some embodiments, the estimated location includes an estimated starting boundary location of the second watermark payload within the alternate segment. In yet another embodiment, determining whether or not the set of candidate watermark symbols represents the second watermark payload value includes comparing the set of candidate watermark symbols to symbols that represent of the second watermark value. In still another exemplary embodiment, the symbols that represent of the second watermark value are constructed based on the second watermark payload value obtained from the second recovery table.

In a scenario where watermarks are recovered from both the audio and video components, if the two components contain different VP1 payload values, then the receiver will have two alternative payload values which can be used for subsequent queries to the broadcaster server. In such a case, the preferred payload to use for subsequent queries is indicated by the relative values of the priority field specified for the component elements of the recovery data table associated with the respective detected payloads (see last table entry of in FIG. 3). In some embodiments, if the receiver detects watermarks which are not described in the recovery data table, those watermarks should be ignored.

The following exemplary usage scenarios provide some concrete examples as to how the use of such watermarks and the associated Component structure table can be advantageously used to enable features and functionalities that would otherwise not be available to the user, the broadcaster, or third-party provider of enhanced content features.

Exemplary Use Case 1—"No Distinguishing Behavior":

In this scenario, all components of a broadcast service are embedded in synchrony with the same VP1 payload. Thus no use of the Component structure in the recovery data table is required, and the receiver does not have the capability of distinguishing which of the broadcast service components is included in the received presentation.

Exemplary Use Case 2—"Multiple Audio Components":

In this scenario, a broadcast service is delivered with a single video component (e.g., original English dialog spoken) and, e.g., four audio components, each in a different language. The video and English-language audio component are embedded with the same VP1 payload. Each other audio component is embedded with a different VP1 payload. In this scenario, the recovery data tables delivered in response to VP1 payloads from all components contain the same Event data and include Component descriptions for the video component and four audio components. The primary language of each component is given in the associated. Component Descriptor and equal priorities are given to each. Using this information, the receiver and the interactive application are able to determine which Component is being received by comparing the received. VP1 payload values to the Component descriptions. The information in the associated component descriptor may be acted upon by the receiver and any interactive applications associated with the content to tailor the user interface language to the language in the received audio component.

Exemplary Use Case 3—"Multiple Video Components":

In this scenario, a broadcast service is delivered with multiple video components (e.g., a sports broadcast with two video components, such as a main video and helmet cam video, and a single audio component). The main video and audio components are embedded with the same VP1 payload values while, for example, the helmet cam video component is embedded with a different VP1 payload. The recovery data tables delivered in response to VP1 payloads from all components contain the same Event data and include Component descriptions for the two video components and the audio component. A description of each component is provided in the associated Component Descriptor and equal priorities are given to each component. The interactive application is able to determine which Component is being received by comparing the received VP1 payload values to the Component descriptions. The information in the associated component descriptor can be acted upon by the interactive applications associated with the content to ensure that the interactive user interface does not conflict with the selected video component.

Use Case 4—"Alternate MVPD Features":

In this scenario, a broadcaster provides a broadcast service to MVPD-1 under an agreement that it will offer both interactive applications and broadband audio enhancements to its customers and to MVPD-2 under an agreement that it will offer only broadband audio enhancements to its customers using the watermark. The broadcaster embeds the same VP1 payloads in the video and audio component which is delivered to MVPD-1 (let's call this payload sequence 1). In order to avoid supporting two video encoding chains, the broadcaster delivers the same video component to MVPD-2 but with an audio component embedded with different VP1 payloads (let's call this payload sequence 2).

The broadcaster publishes recovery data tables for payload sequences 1 and 2. The Component structures are the same in all recovery data tables and include descriptions of the one video and two audio components. The audio component delivered to MVPD-2 is given a higher priority than the other components. This ensures that receivers of MVPD-2 customers (which receive video carrying payload sequence 1 and audio carrying payload sequence 2) perform queries using payload sequence 2. The recovery data tables associated with payload sequence 1 can include both interactive application and broadband audio enhancement Trigger URI events, while those for payload sequence 2 can include only the broadband audio enhancement Trigger URI events.

The disclosed embodiments, thus enable recovery of metadata in broadcast content having multiple alternative audio and video components, including embedding coincident audio or video components of the broadcast content with different watermark payloads. Each marked component can carry only a single watermark payload in a watermark segment. Recovery data for watermark payloads embedded in a component of a broadcast service can be published. Further, a receiver can be provided with information about the multiple coincident watermark segments in the broadcast content. For example, providing such further information can include providing a recovery data table that includes a component structure. The receiver detects a watermark and queries the broadcaster server to obtain the recovery data table associated with the detected 20 watermark. The information in the component structure is used by the receiver to tailor its interactive presentation.

Figure 6:
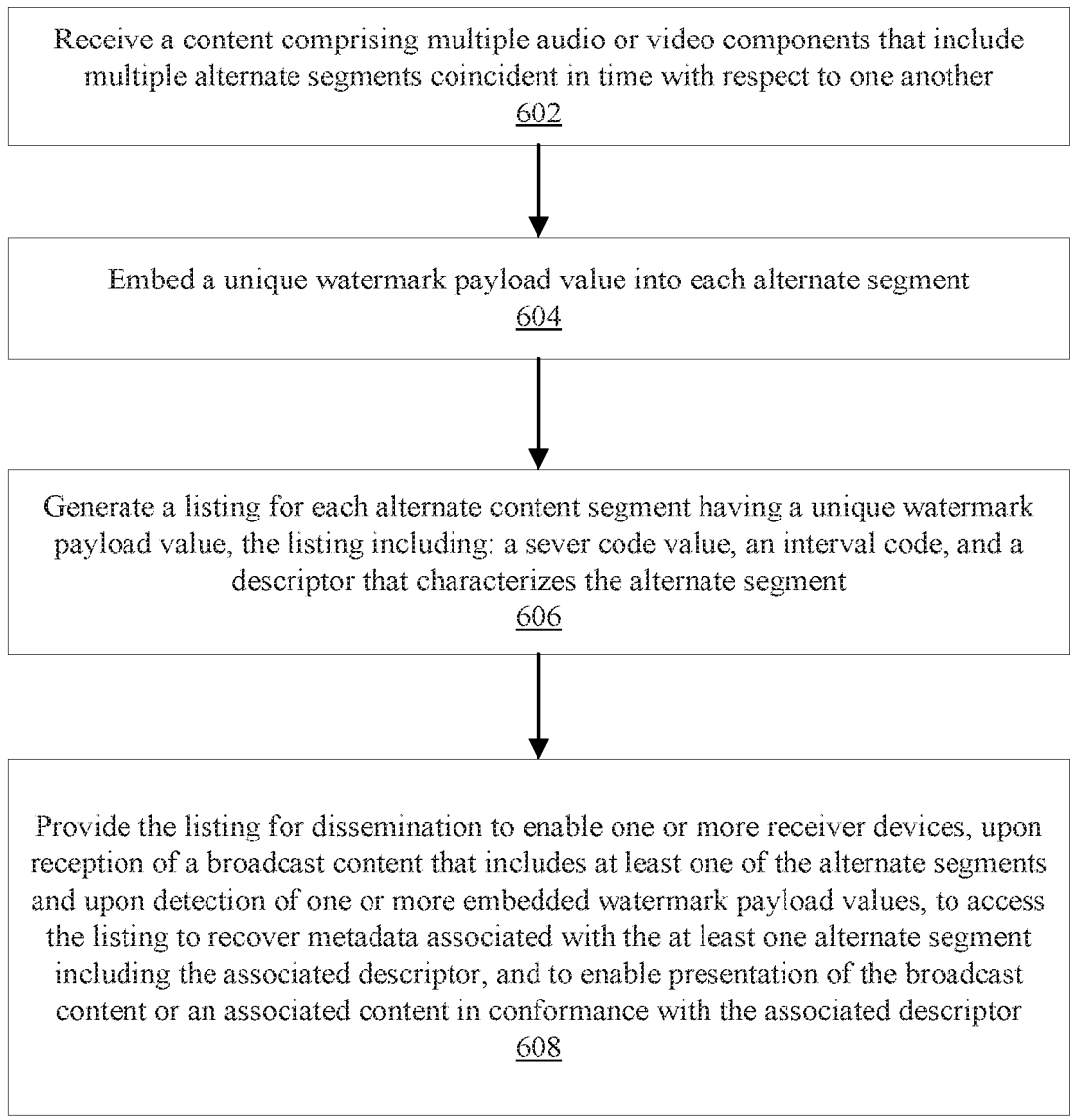
FIG. 6 illustrates a set of exemplary operations that can be carried out at a receiver device to utilize coincident watermarked segments to improve detection of watermarks from a content in accordance with an exemplary embodiment.

FIG. 6 illustrates a set of exemplary operations that can be carried out at a receiver device to utilize coincident watermarked segments to improve detection of watermarks from a content in accordance with an exemplary embodiment. At 602, a content is received that includes multiple audio or video components including multiple alternate segments coincident in time with respect to one another. At 604, a unique watermark payload value is embedded into each alternate segment. The embedding can be carried out using a watermark embedder that is implemented at least partially in hardware. At 606, a listing for each alternate content segment having a unique watermark payload value is generated. The listing includes the following: a sever code value, an interval code, and a descriptor that characterizes the alternate segment. At 608, the listing for provided for dissemination to enable one or more receiver devices, upon reception of a broadcast content that includes at least one of the alternate segments and upon detection of one or more embedded watermark payload values, to access the listing to recover metadata associated with the at least one alternate segment including the associated descriptor, and to enable presentation of the broadcast content or an associated content in conformance with the associated descriptor.

In some embodiments, the listing further includes: a time anchor value indicative of a time value of a starting boundary location of watermark payload within the alternate content segment, a priority value, and a type value indicative of a component type of the alternate content segment. In one exemplary embodiment, the anchor time is in coordinated universal time (UTC) format. In some exemplary embodiments, the type value is indicative of one of a video or audio type. In some embodiments, the priority value is indicative of a relative importance of the alternate content segment such that a higher priority value provides a higher precedence for metadata associated with the alternate content segment compared to another alternate content segment which has a lower priority value.

According to one exemplary embodiment, the descriptor is indicative of one of the following: a primary video, an alternate camera view, a primary audio, a video descriptive audio source, a foreign language audio, a helmet camera video, or a text information for consumption by an interactive application. In yet another exemplary embodiment, providing the listing for dissemination to one or more receiver devices includes publishing the listing to a server. In still another embodiment, the listing is of a component structure of a recovery data file.

In one exemplary embodiment, the operations that are shown in FIG. 6 further includes forming the broadcast content for transmission of the broadcast content to the one or more receiver devices that reside at a user premise, or for transmission to a multichannel video program distributor (MVPD), the broadcast content including: (1) a primary content comprising a first watermark payload value, and (2) a particular alternate content segment coincident with the primary content and comprising a second watermark payload value. For example, the primary content can be a video component and the particular alternate content segment can be an audio component in a foreign language. In another example, the primary content is a video component and the particular alternate content segment is an additional video component that enhances an aspect of the primary content.

In another embodiment, the operations of FIG. 6 further include selecting a primary content comprising a first watermark payload value, forming a first broadcast content for transmission to a first multichannel video program distributor (MVPD), the first broadcast content including the primary content and a first alternate content segment coincident with the primary content and comprising the same first watermark payload value, and forming a second broadcast content for transmission to a second MVPD, the second broadcast content including the primary content and a second alternate content segment coincident with the primary content and comprising a second watermark payload value. In still another exemplary embodiment, the operations of FIG. 6 further include delivering the broadcast content that includes a primary content comprising a first watermark payload value, and a plurality of alternate content segments each having a different watermark payload embedded therein, to a user premises so as to allow selection of a particular alternate content segment by a user.

Figure 7:
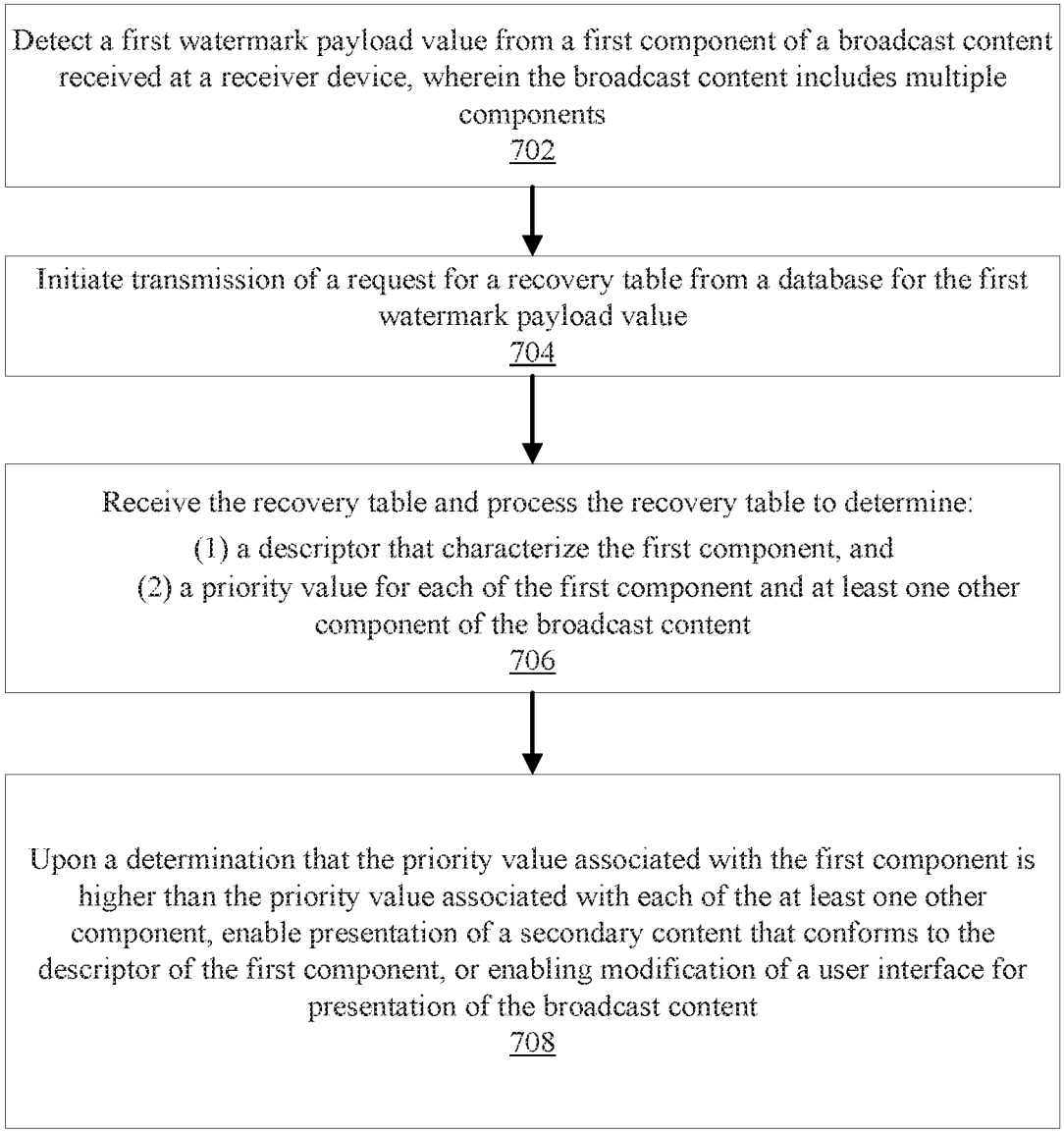
FIG. 7 illustrates a set of exemplary operations that can be carried out at a receiver device to enhance presentation of a broadcast content that includes multiple components in accordance with an exemplary embodiment.

FIG. 7 illustrates a set of exemplary operations that can be carried out at a receiver device to enhance presentation of a broadcast content that is associated with multiple components accordance with an exemplary embodiment. At 702, a first watermark payload value is detected from a first component of a broadcast content received at a receiver device. The broadcast content includes multiple components. The first watermark payload value can be detected using a watermark extractor that is at least partially implemented in hardware. At 704, transmission of a request for a recovery table from a database is initiated for the first watermark payload value. At 706, the recovery table is received and processed to determine: (1) a descriptor that characterize the first component, and (2) a priority value for each of the first component and the at least one other component. At 708, upon a determination that the priority value associated with the first component is higher than the priority value associated with each of the at least one other component, presentation of a secondary content that conforms to the descriptor of the first component is enabled. Additionally, or alternatively, modification of a user interface for presentation of the broadcast content is enabled.

In another aspect of the disclosed embodiments, a method for enhancing presentation of a broadcast content that includes multiple components is provided. The method includes detecting a first watermark payload value from a first component of a broadcast content received at a receiver device. The first watermark payload value can be detected using a watermark extractor that is at least partially implemented in hardware. The method further includes detecting a second watermark payload value from a second component of the broadcast content which is coincident in time with the first watermark payload value, and initiating transmission of a request to a server for a recovery table associated with the first watermark payload value. The method additionally includes receiving the recovery table and processing the recovery table to determine: (1) a descriptor that characterize the first component, and (2) a priority value for the first component and the second component. Additionally, upon a determination that the priority value associated with the second component is higher than the priority value associated with the first component, the method includes initiating transmission of a request to a server for a recovery table associated with the second watermark payload value. The above method can be implemented in a device that includes a processor and a memory that includes processor executable codes. In some embodiments, a computer program product that is embodied on a computer readable medium, includes program code for implementing this method. The above technique can be particularly useful, when, for example, the device that receives the broadcast content doesn't know which component has the higher priority. In such a scenario, if the device obtains the recovery data for a lower priority component, it can obtain the higher priority recovery data upon determination that the obtained data does not have the higher priority value.

Figure 8:
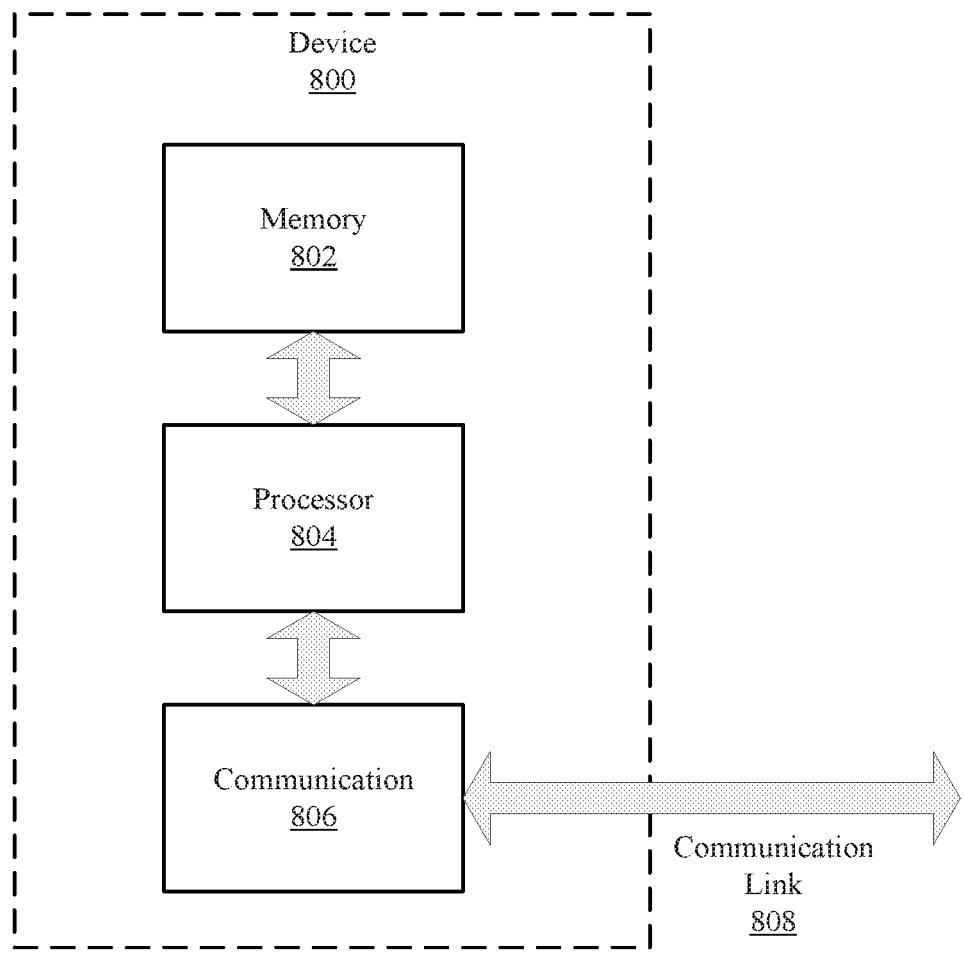
FIG. 8 illustrates a block diagram of an exemplary device that can accommodate the disclosed embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 8 illustrates a block diagram of a device 800 within which the various disclosed embodiments may be implemented. The device 800 comprises at least one processor 802 and/or controller, at least one memory 804 unit that is in communication with the processor 802, and at least one communication unit 806 that enables the exchange of data and information, directly or indirectly, through the communication link 808 with other entities, devices and networks. The communication unit 806 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Referring back to FIG. 8 the device 800 and the like may be implemented in software, hardware, firmware, or combinations thereof, and as part of a watermark embedder, watermark extractor and/or a receiver device. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for processing a content to enable recovery of metadata associated therewith, the method comprising:
receiving a content comprising multiple audio or video components that include one or more alternate segments coincident in time with respect to one another or with segments of the audio or video components;
using a watermark embedder that is implemented at least partially in hardware to embed a watermark payload value into the one or more alternate segments, the watermark payload value being different from a watermark payload value in another alternate segment or in a segment of the audio or video components that is coincident in time with the one or more alternate segments;
generating a listing for the one or more alternate content segments, the listing including:
a server code value,
an interval code, and
a descriptor that identifies or describes the alternate segment; and
providing the listing for dissemination to enable one or more receiver devices to, upon reception of a transmitted content that includes at least one of the alternate segments and upon detection of one or more watermark payload values that are embedded in the at least one of the alternate segments, access the listing to recover metadata associated with the at least one alternate segment including the associated descriptor, and present the transmitted content or an associated content in conformance with the associated descriptor.

2. The method of claim 1, wherein the listing includes:
a time anchor value indicative of a time value of a starting boundary location of watermark payload within the one or more alternate content segments,
a priority value, and
a type value indicative of a component type of the one or more alternate content segments.

3. The method of claim 2, wherein the anchor time is in coordinated universal time (UTC) format.

4. The method of claim 2, wherein the type value is indicative of a video or an audio type.

5. The method of claim 2, wherein the priority value is indicative of a relative importance of the one or more alternate content segments such that a higher priority value provides a higher precedence for metadata associated with the one or more alternate content segments compared to another alternate content segment which has a lower priority value.

6. The method of claim 1, wherein the descriptor is indicative of one of the following:
a primary video,
an alternate camera view,
a primary audio,
a video descriptive audio source,
a foreign language audio,
a helmet camera video, or
a text information for consumption by an interactive application.

7. The method of claim 1, wherein providing the listing for dissemination includes publishing the listing to a server.

8. The method of claim 1, wherein the listing is of a component structure of a recovery data file.

9. The method of claim 1, further comprising:
forming the content for transmission to the one or more receiver devices that reside at a user premise, or for transmission to a multichannel video program distributor (MVPD), the content including: (1) a primary content comprising a first watermark payload value, and (2) a particular alternate content segment coincident with the primary content and comprising a second watermark payload value.

10. The method of claim 9, wherein the primary content is a video component and the particular alternate content segment is an audio component in a foreign language.

11. The method of claim 9, wherein the primary content is a video component and the particular alternate content segment is an additional video component that enhances an aspect of the primary content.

12. The method of claim 1, further comprising:
selecting a primary content comprising a first watermark payload value;
forming a first content for transmission to a first multichannel video program distributor (MVPD), the first content including the primary content and a first alternate content segment coincident with the primary content and comprising the same first watermark payload value; and
forming a second content for transmission to a second MVPD, the second content including the primary content and a second alternate content segment coincident with the primary content and comprising a second watermark payload value.

13. The method of claim 1, further comprising:
delivering the content that includes a primary content comprising a first watermark payload value, and a plurality of alternate content segments each having a different watermark payload value embedded therein, to a user premises so as to allow selection of a particular alternate content segment by a user.

14. A device, comprising:
a processor; and
a memory including processor executable code, the processor executable code, when executed by the processor, causes the device to:
receive a content comprising multiple audio or video components that include one or more alternate segments coincident in time with respect to one another or with segments of the audio or video components;
embed a watermark payload value into the one or more alternate segments, the watermark payload value being different from a watermark payload value in another alternate segment or in a segment of the audio or video components that is coincident in time with the one or more alternate segments;
generate a listing for the one or more alternate content segments, the listing including:
a server code value,
an interval code, and
a descriptor that identifies or describes the alternate segment; and
provide the listing for dissemination to enable one or more receiver devices to, upon reception of a transmitted content that includes at least one of the alternate segments and upon detection of one or more watermark payload values that are embedded in the at least one of the alternate segments, to access the listing to recover metadata associated with the at least one alternate segment including the associated descriptor, and present the transmitted content or an associated content in conformance with the associated descriptor.

15. The device of claim 14, wherein the listing further includes:
a time anchor value indicative of a time value of a starting boundary location of watermark payload within the one or more alternate content segments,
a priority value, and
a type value indicative of a component type of the one or more alternate content segments.

16. The device of claim 15, wherein the anchor time is in coordinated universal time (UTC) format.

17. The device of claim 15, wherein the type value is indicative of a video or an audio type.

18. The device of claim 15, wherein the priority value is indicative of a relative importance of the one or more alternate content segments such that a higher priority value provides a higher precedence for metadata associated with the one or more alternate content segments compared to another alternate content segment which has a lower priority value.

19. The device of claim 14, wherein the descriptor is indicative of one of the following:
a primary video,
an alternate camera view,
a primary audio,
a video descriptive audio source,
a foreign language audio,
a helmet camera video, or
a text information for consumption by an interactive application.

20. The device of claim 14, wherein the processor executable code, when executed by the processor, causes the device to provide the listing by publishing the listing to a server.

21. The device of claim 14, wherein the listing is of a component structure of a recovery data file.

22. The device of claim 14, wherein the processor executable code, when executed by the processor, further configures the device to:
form the content for transmission to the one or more receiver devices that reside at a user premise, or for transmission to a multichannel video program distributor (MVPD), the content including: (1) a primary content comprising a first watermark payload value, and (2) a particular alternate content segment coincident with the primary content and comprising a second watermark payload value.

23. The device of claim 22, wherein the primary content is a video component and the particular alternate content segment is an audio component in a foreign language.

24. The device of claim 22, wherein the primary content is a video component and the particular alternate content segment is an additional video component that enhances an aspect of the primary content.

25. The device of claim 14, wherein the processor executable code, when executed by the processor, causes the device to:
select a primary content comprising a first watermark payload value;
form a first content for transmission to a first multichannel video program distributor (MVPD), the first content including the primary content and a first alternate content segment coincident with the primary content and comprising the same first watermark payload value; and
form a second content for transmission to a second MVPD, the second content including the primary content and a second alternate content segment coincident with the primary content and comprising a second watermark payload value.

26. The device of claim 14, wherein the processor executable code, when executed by the processor, further causes the device to:
deliver the content that includes a primary content comprising a first watermark payload value, and a plurality of alternate content segments each having a different watermark payload value embedded therein, to a user premises so as to allow selection of a particular alternate content segment by a user.

27. A computer program product, embodied on one or more non-transitory computer readable media, comprising:
program code for receiving a content comprising multiple audio or video components that include one or more alternate segments coincident in time with respect to one another or with segments of the audio or video components;
program code for using a watermark embedder to embed a watermark payload value into the one or more alternate segments, the watermark payload value being different from a watermark payload value in another alternate segment or in a segment of the audio or video components that is coincident in time with the one or more alternate segments;
program code for generating a listing for the one or more alternate content segments, the listing including:
a server code value,
an interval code, and
a descriptor that identifies or describes the alternate segment; and
program code for providing the listing for dissemination to enable one or more receiver devices to, upon reception of a transmitted content that includes at least one of the alternate segments and upon detection of one or more watermark payload values that are embedded in the at least one of the alternate segments, access the listing to recover metadata associated with the at least one alternate segment including the associated descriptor, and present the transmitted content or an associated content in conformance with the associated descriptor.

* * * * *